United States Patent [19]
Stauffer

[11] 3,945,023
[45] Mar. 16, 1976

[54] AUTO-FOCUS CAMERA WITH SOLID STATE RANGE FINDER

[75] Inventor: Norman L. Stauffer, Englewood, Colo.

[73] Assignee: Honeywell Inc., Minneapolis, Minn.

[22] Filed: Mar. 29, 1974

[21] Appl. No.: 456,289

[52] U.S. Cl. .................... 354/25; 33/284; 355/56; 356/4; 356/8
[51] Int. Cl.² .................... G03B 13/18; G01C 3/08
[58] Field of Search ......... 354/25; 352/140; 355/56; 33/284; 356/3, 8, 4

[56] References Cited
UNITED STATES PATENTS

| | | | |
|---|---|---|---|
| 3,532,045 | 10/1970 | Genahr | 354/25 |
| 3,736,057 | 5/1973 | Harvey | 354/25 |
| 3,836,772 | 9/1974 | Stauffer | 250/204 |
| 3,838,275 | 9/1974 | Stauffer | 250/204 |

*Primary Examiner*—Joseph F. Peters, Jr.
*Attorney, Agent, or Firm*—Arthur H. Swanson; Lockwood D. Burton; George E. Bodenstein

[57] ABSTRACT

An auto-focus camera includes a range finder device having no moving parts. First and second stationary lens devices receive radiation from an object along two spatially separate paths. First and second sensing devices, each comprising a plurality of photoresponsive elements, are arranged to receive the radiation passing through the first and second lens devices, respectively. The first and second sensing devices provide electrical signals representative of the relative position of the intensity distribution of the radiation passing through the second lens device and falling on the second sensing device with respect to the position of the intensity distribution of the radiation passing through the first lens device and falling on the first sensing device. A detecting circuit connected to the first and second sensing devices provides an output signal indicative of that of a plurality of predetermined zones in which the object is located.

The camera further includes a control circuit responsive to the range finder output signal for moving the objective lens in the camera to a position at which an image of the object is properly focused on a light sensitive film within the camera.

9 Claims, 3 Drawing Figures

AUTO-FOCUS CAMERA WITH SOLID STATE RANGE FINDER

CROSS REFERENCE TO RELATED APPLICATIONS

The subject matter disclosed but not claimed herein is disclosed and claimed in application Ser. No. 529,573 of Norman L. Stauffer, filed on Dec. 4, 1974.

BACKGROUND OF THE INVENTION

The present invention relates generally to auto-focus cameras, and more particularly to an automatic range finder device which may be included in an auto-focus camera such as may be found, in accordance with U.S. Patent Office classification, in Class 33, Sub-class 284, or Class 95, Sub-class 44, or Class 250, Sub-class 204.

In the past, most automatic focusing systems have required two basic motions. One is a motion of a focusing lens with respect to a plane upon which a focused image of a scene is to be formed. The second motion is a scanning motion of a light detector with respect to the image at that or a related image plane. Some focus detecting systems have been developed which obviate the requirement of scanning the image plane in order to determine the best focus position of the objective lens. However, those systems have introduced other disadvantages such as being optically complex, costly, and relatively inaccurate.

SUMMARY OF THE INVENTION

It is, accordingly, an object of the present invention to provide an improved focus detecting apparatus which obviates the disadvantages of prior art devices.

It is another object of the present invention to provide a focus detecting apparatus which requires no scanning movement.

It is yet another object of the present invention to provide a focus detecting apparatus as set forth, which is relatively simple in design.

It is a further object of the present invention to provide a focus detecting apparatus as set forth, which is more accurate and reliable than prior art devices.

In accomplishing these and other objects, there has been provided, in accordance with the present invention, an improved range finder which is adaptable for use with an automatic focusing camera. The range finder includes first and second stationary sensing devices arranged to receive light from an object by separate light paths through first and second stationary lens devices, respectively. The first and second sensing devices provide electrical signals which are representative of the relative position of the light distribution pattern formed on the first sensing device with respect to the light distribution pattern formed on the second sensing device. A circuit means receives the electrical signals from the first and second sensing devices and provides one of a plurality of predetermined output signals which is representative of the distance that the object is displaced from the range finder. Further circuit means are provided in the auto-focus camera to be responsive to the output signal of the range finder to move an objective lens of the camera to a position whereat an image of the object formed on a light sensitive film plane is in proper focus.

BRIEF DESCRIPTION OF THE DRAWINGS

A better understanding of the present invention may be had from the following detailed description when read in connection with the accompanying drawings in which.

DESCRIPTION OF THE PREFERRED EMBODIMENT

Figure 1:
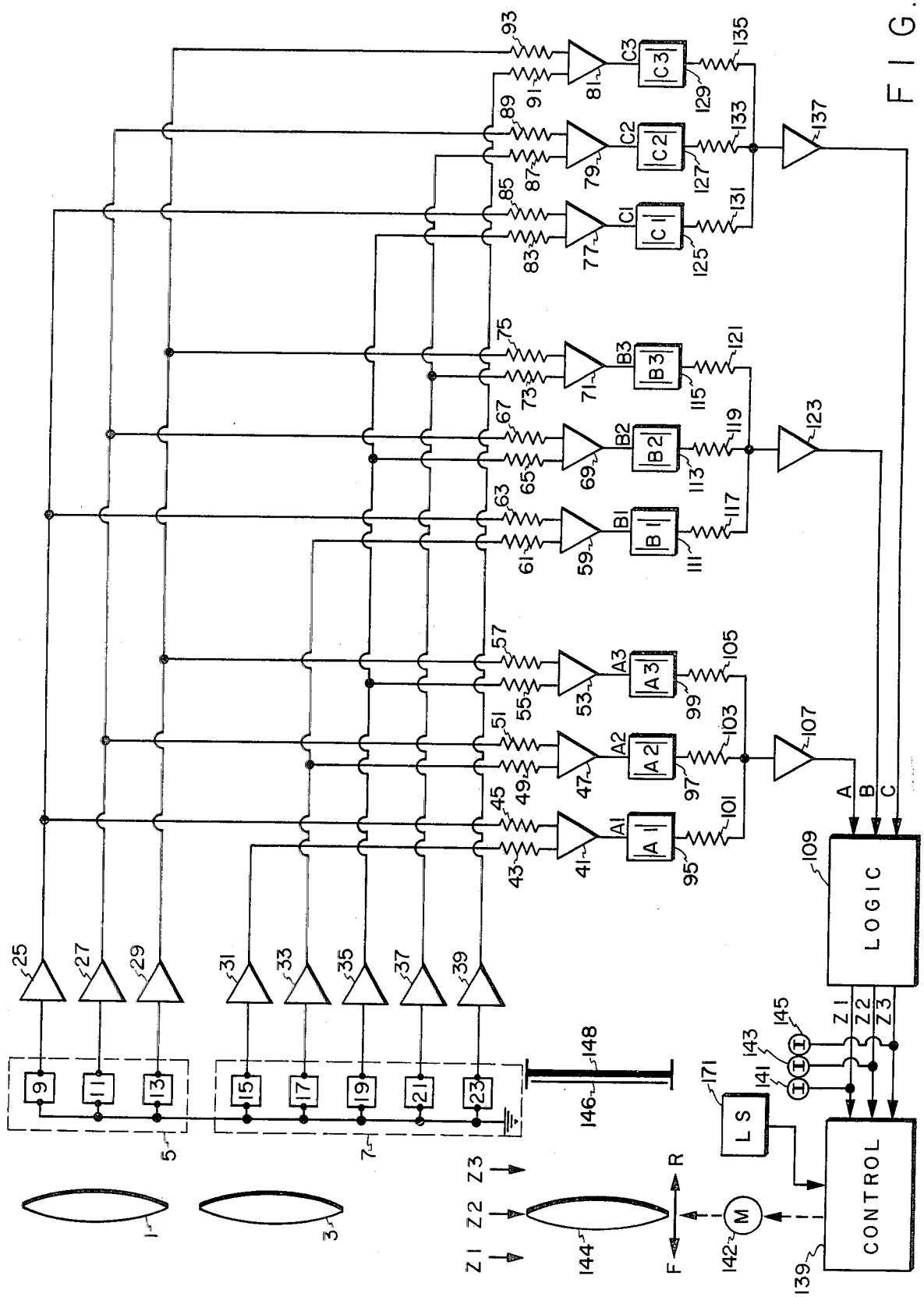
FIG. 1 is a schematic diagram of one embodiment of the present invention.

Referring to FIG. 1 in detail, there are shown first and second stationary lens devices 1 and 3, respectively. Situated behind the first lens device 1 is a first stationary sensing means 5. The first sensing means 5 is arranged to receive radiation from a relatively distant object through the first lens device 1. A second stationary sensing means 7 is similarly placed behind the second lens device 3 to receive radiation from the object through the second lens device 3. The first sensing means 5 includes, in the present example, three photo-responsive elements 9, 11, and 13. The second stationary sensing means 7, in the present example, includes five photo-responsive elements 15, 17, 19, 21 and 23, respectively. Output terminals from the photo-responsive elements 9, 11, and 13 of the first sensing means 5 are connected to corresponding isolating or buffer amplifiers 25, 27 and 29, respectively. Similarly, the output terminals from the five photo-responsive elements 15, 17, 19, 21 and 23 of the second stationary sensing means 7 are connected to corresponding isolating or buffer amplifiers 31, 33, 35, 37 and 39, respectively. Each photo-responsive element therefore is connected to an associated buffer amplifier.

A differential amplifier 41 receives input signals through resistors 43 and 45, respectively, from the buffer amplifiers 25 and 31. Similarly, a differential amplifier 47 receives input signals through individual resistors 49 and 51, respectively, from the second buffer amplifier 33 of the second sensing means 7 and the second buffer amplifier 27 of the first sensing means 5. A further differential amplifier 53 receives input signals through resistors 55 and 57, respectively, from the buffer amplifier 35 and the buffer amplifier 29. A differential amplifier 59 also receives input signals through separate resistors 61 and 63 from the buffer amplifier 33 and the buffer amplifier 25. Similarly, the buffer amplifier 35 and the buffer amplifier 27 provide input signals through corresponding resistors 65 and 67 to another differential amplifier 69. A differential amplifier 71 receives input signals through individual resistors 73 and 75 from the buffer amplifier 37 and the buffer amplifier 29. The third group of the three differential amplifiers 77, 79 and 81 compare, respectively, the output signals of the buffer amplifiers 25, 27 and 29 with the output signals of the three buffer amplifiers 35, 37 and 39. The differential amplifier 77 receives input signals through individual resistors 83 and 85 from the buffer amplifier 35 and the buffer amplifier 25. The buffer amplifier 37 and the buffer amplifier 27 provide input signals through individual resistors 87 and 89 to the differential amplifier 79. The differential amplifier 81 receives input signals through individual resistors 91 and 93 from the buffer amplifier 39 and the buffer amplifier 29, respectively.

The first three differential amplifiers 41, 47 and 53 provide output signals A1, A2, and A3, respectively, which are applied to corresponding absolute value determining circuits 95, 97 and 99, respectively. The output signals from the absolute value circuits 95, 97 and 99 are applied, respectively, through resistors 101, 103 and 105 to the input terminal of another amplifier 107. The amplifier 107 provides an output signal A which is applied as an input signal to a logic circuit 109.

The second three differential amplifiers 59, 69 and 71 provide output signals B1, B2 and B3 which are applied to individual absolute value determining circuits 111, 113 and 115, respectively. The outputs of the absolute value circuits 111, 113 and 115 are applied through individual resistors 117, 119 and 121, respectively, to an amplifier 123. The amplifier 123 provides an output signal B which is also applied to the logic circuit 109. The last three differential amplifiers 77, 79 and 81 provide output signals C1, C2 and C3 which are applied to associated absolute value determining circuits 125, 127 and 129, respectively. The output signals of the absolute value circuits 125, 127 and 129 are applied through associated resistors 131, 133 and 135, respectively, to another amplifier 137. The amplifier 137 provides an output signal C which is also applied to the logic circuit 109.

The logic circuit 109 receives the input signals A, B and C and provides output signals Z1, Z2 and Z3 which are, in turn, applied to a control circuit 139. Each output signal Z1, Z2 and Z3 of the logic circuit 109 is also applied to an indicator or annunciator 141, 143 and 145, respectively. The indicators or annunciators 141, 143 and 145 may either give audible, visual, or other perceptible indication when a predetermined potential appears on the line to which they are connected. The control circuit 139 operates a motor 142 which, in turn, moves an objective lens means 144 in either forward (F) or reverse (R) directions. Radiation from the object will pass through the objective lens means 144 and fall on a light sensitive film 146 which is positioned against support means 148 for defining an image plane. In the present example, the objective lens device 144 is operable to move to one of three predetermined zone positions Z1, Z2 or Z3.

Figure 2:
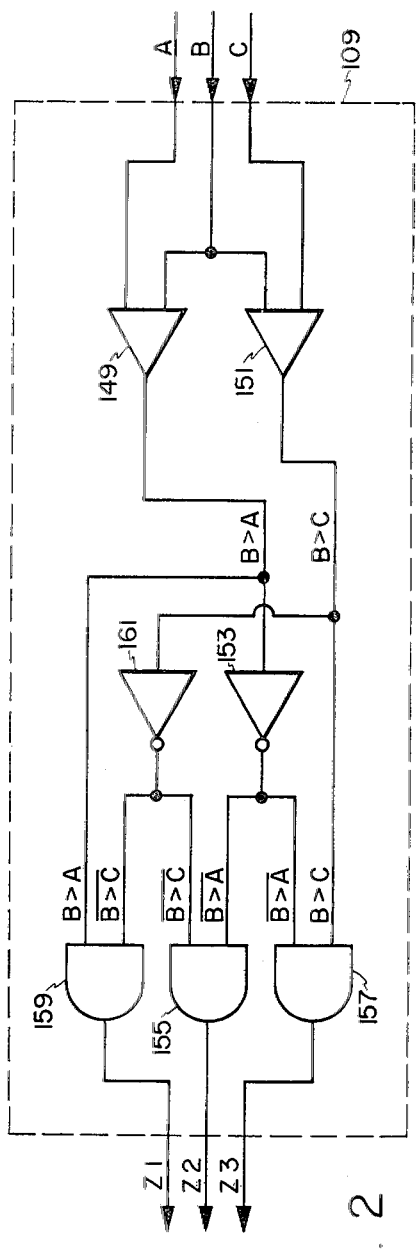
FIG. 2 is a schematic diagram of an exemplary construction of the logic circuit of FIG. 1.

The logic circuit 109 is shown in detail in FIG. 2. The signal A provides one input to an amplifier 149 while the signal C provides one input to another amplifier 151. The signal B provides the second input signal to both amplifiers 149 and 151. The amplifier 149 compares the signals A and B to provide an output signal which is of a predetermined value when the signal B is greater than the signal A. Similarly, the amplifier 151 compares the signal B with the signal C and provides a predetermined output signal when the signal B is greater than the signal C. The output signal from the amplifier 149 is applied through an inverter 153 to provide an input signal to each of two AND gates 155 and 157. The output signal from the amplifier 149 also provides an input signal to a third AND gate 159. The output signal from the amplifier 151 is applied through an inverter 161 to provide a second input signal to each of the AND gates 155 and 159. The output signal of the amplifier 151 also provides a second input signal to the AND gate 157. The gates 159, 155 and 157 provide the output signals Z1, Z2 and Z3, respectively, of the logic circuit 109.

It should be noted that although the photo-responsive elements 9 through 23 are shown in FIG. 1 facing the reader, it is understood that, in an actual construction, the faces of the photo-responsive elements are arranged to receive the light passing through the lens devices 1 and 3. It should further be noted that it is not necessary for the proper operation of the present invention that the image formed on the first and second stationary sensing means 5 and 7 be in proper focus so long as identifiable light intensity distributions are formed thereon.

Figure 3:
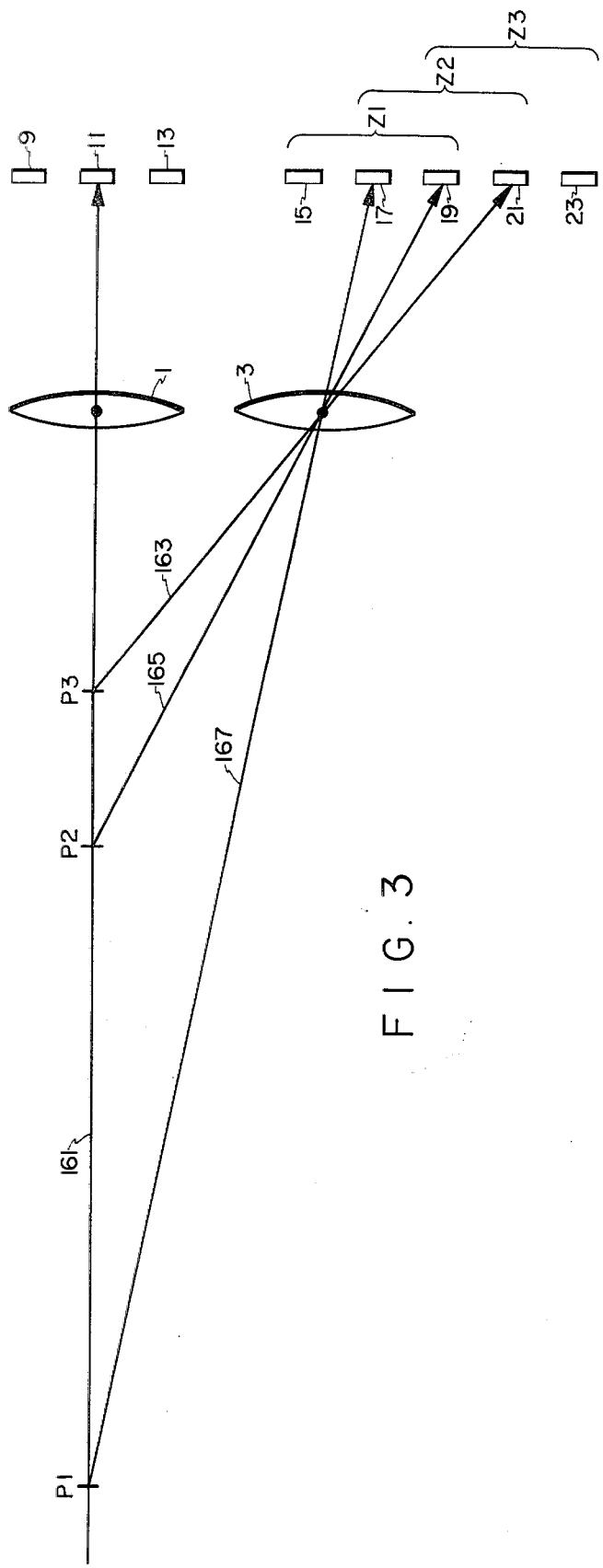
FIG. 3 is a schematic diagram illustrating the principle of operation of the present invention.

In explaining the operation of the present invention, it will be helpful to refer to FIG. 3. In FIG. 3, three distinct positions P1, P2 and P3 are indicated along a first light path 161. Radiation from an object which may be located in any position along the first light path 161, will pass through the first stationary lens means 1 and fall on the photo-responsive elements 9, 11 and 13 of the first sensing means 5. Depending upon the position of the object, radiation from that object will also pass along a second light path defined by the radiation passing through the second lens device 3, and fall on the photo-responsive elements 15, 17, 19, 21 and 23 of the second sensing means 7. Three axes of radiation 163, 165 and 167 are shown in FIG. 3 as emanating from the three different positions and passing through the second lens device 3 to the second sensing means 7.

If an object is located at the position P3 in FIG. 3, for example, radiation therefrom will pass through the first lens device 1 and fall on the first sensing means 5. That radiation may not form a focused image of the object at the position P3 upon the first sensing means 5 but it is not essential that a focused image be so formed. It is sufficient if an identifiable light intensity distribution relative to the photo-responsive elements is formed at the sensing means. When an object is at the position P3 an intensity distribution will be formed at the first sensing means 5 and that distribution will be centered upon the photo-responsive element 11 thereof. Radiation from an object at position P3 will also pass generally along the line 163 through the lens device 3 and fall on the remote portion of the second sensing means 7. More specifically, the intensity distribution formed on the second sensing means 7 from the object at the position P3 will be centered upon the photo-responsive element 21 of the second sensing means 7. Therefore, with an object at the position P3, the intensity of the radiation falling on the photo-responsive element 9 in the first sensing means 5 will be substantially equal to the intensity of the radiation falling on the third photo-responsive element 19 of the second sensing means 7 since both intensity distribution patterns are substantially the same. Similarly, the intensity of the radiation falling on the photo-responsive element 11 of the first sensing means 5 will be substantially equal to the intensity of the radiation falling on the photo-responsive element 21 of the second sensing means 7, and the intensity of the radiation falling on the photo-responsive elements 13 and 23 will also be substantially equal. Therefore, when circuit means are provided, as shown in FIG. 1, which determines that the intensity distribution falling on the photo-responsive elements 9, 11 and 13 substantially matches the intensity distribution falling on the elements 19, 21 and 23, it can be said that the object the distance to which from the range finder device is to be determined, is generally located at the position P3. Similarly, if the circuit means connected to the first and second sensing means 5 and 7 determines that the intensity distribution falling on the photo-responsive elements 9, 11 and 13 of the first sensing means 5 is substantially identical to the intensity distribution falling on the second, third and fourth photo-responsive elements 17, 19 and 21 of the second sensing means 7, the object whose displacement from the range finding device is to be sought is generally located at the position P2. In like manner if the intensity distribution falling on the photo-responsive elements 9, 11 and 13 of the first sensing means 5 substantially matches the intensity distribution falling on the first three photo-responsive elements 15, 17 and 19 of the sensing means 7, it can be said that the object from which the radiation forming the intensity distributions emanates, is generally located at the position P1.

The positions P1, P2 and P3 generally define zones Z1, Z2 and Z3 of displacement from the range finding device. An objective lens means such as the lens 144 will, for any given position, provide at the image plane a focused image of any object within a corresponding zone displaced from that objective lens means, depending upon the particular focal characteristics of that particular lens device. Therefore the zone approach to automatic focusing disclosed herein is practical and effective. That is, it is not essential that the range finding device determine the exact displacement from the device itself but only that it determine a general displacement from which it can be determined in which of a predetermined number of zones the object may be found. Once the zone in which the object is located is determined, the objective lens means 144 may be moved to one of a predetermined number of distinct positions corresponding to the number of zones used in any particular application. Thereafter, any object within that zone will be properly focused upon the light sensitive film 146 of a camera for example.

It should here be noted, that the present invention is not limited to a three zone system as shown in the exemplary embodiment. Any number of zones may be used. For example if a four zone system were desired, the first sensing means 5 could still comprise three photo-responsive elements but the second sensing means 7 would then comprise six photo-responsive elements, i.e. the number of zones to be used plus two. The number of photo-responsive elements in the first sensing means may also be changed if desired without departing from the spirit of the present invention. For example, again if a four zone system were desired, the first sensing means 5 may include 4 or 5 or more photo-responsive elements and the second sensing means 7 would then include seven or eight or more photo-responsive elements, respectively. The number of photo-responsive elements in the second sensing means will equal the number of photo-responsive elements in the first sensing means plus one less than the number of zones used. Any number of photo-responsive elements may be used in the first sensing means, and any number of zones may be used to practice the present invention.

The width of each detector element must be equal to the relative image motion or phase which would occur if the subject distance moved from the center of one zone to the center of the next. The total distance moved for all zones from infinity to a near distance is:

$$e = \frac{fd}{s}$$

wherein $e$ is the total distance moved, $f$ is the distance between the plane containing the first and second lens means and the plane of the photo-responsive elements of the first and second sensing means, $d$ is the distance between centers of the first and second lens devices 1 and 3, and S is the near distance of the closest zone. Thus if n zones are considered, each detector width $w$ must be:

$$w = e/n = \frac{fd}{n \cdot s}.$$

The circuit used to determine which group of three photo-responsive elements in the second sensing means 7 provides output signals which are most similar to the output signals provided by the photo-responsive elements of the first sensing means 5, is that shown in FIG. 1. For purposes of explaining the operation of the exemplary embodiment, it will be assumed that the object which is to be focused on the light sensitive film 146 is at a position P2 in the central zone of FIG. 3. Therefore, the intensity distribution of the radiation passing through the first lens device 1 will fall on the photo-responsive elements 9, 11 and 13, and a substantially similar intensity distribution will fall on the middle group of three photo-responsive elements 17, 19 and 21 from radiation passing through the second lens device 3. That is, when the object, the distance to which is to be determined, is located at the position P2 the intensity distribution therefrom will be centered on the photo-responsive element 11 of the first sensing means 5 and substantially the same intensity distribution will be centered on the photo-responsive element 19 of the second sensing means 7. Therefore, the output signal from the photo-responsive element 9 will be substantially the same as the output signal from the photo-responsive element 17, the output from the photo-responsive element 11 will be substantially the same as the output from the photo-responsive element 19, and the outputs from the photo-responsive elements 13 and 21 will also be substantially identical. The differential amplifier 59 compares output signals provided by the first photo-responsive element 9 of the first sensing means 5, and the second photo-responsive element 17 of the second sensing means 7. Since those two photo-responsive elements receive substantially the same illumination when the object is in the second zone Z2 at the position P2, the output signal from the differential amplifier 59 will be substantially zero. Similarly, when the object is in the position P2, the outputs from each of the differential amplifiers 69 and 71 will also be substantially zero. Those output signals B1, B2 and B3 are added together and applied to the amplifier 123 to provide the signal B which is, in turn, applied to the logic circuit 109.

Since the intensity distribution falling on the photo-responsive elements 9, 11 and 13 does not match up with the intensity distribution falling on either the light responsive elements 15, 17 and 19 or the intensity distribution falling on the photo-responsive elements 19, 21 and 23, the outputs of corresponding photo-responsive elements will necessarily not be the same, i.e., the output signal from the photo-responsive element 9 will not be the same as either the output signal from the photo-responsive element 15 or the output signal from the photo-responsive element 19. Therefore, the differential amplifier 41 will provide an output signal A1 which is not substantially zero. Likewise, the differential amplifier 77 will provide an output signal C1 which is not substantially zero. Similarly, signals A2 and A3 as well as the signals C2 and C3 will have a magnitude greater than zero in the present example.

The circuits 95, 97 and 99 derive the absolute value from the signals A1, A2 and A3. Those absolute values are added together and applied to the amplifier 107 to provide the signal A which is, in turn, applied to the logic circuit 109. The circuits 125, 127 and 129 derive the absolute value from the signals C1, C2 and C3. Those absolute value signals are added together and applied through the amplifier 137 to provide the input signal C to the logic circuit 109. Therefore, the signal B is substantially zero while the signals A and C have a positive value greater than zero when the object is in the zone of position P2.

Referring to FIG. 2, the amplifier 149 provides a logic "1" output signal when the signal B is greater than the signal A. The amplifier 151 provides a logic "1" output signal when the signal B is greater than the signal C. In the present example the signal B is less than both signals A and C and therefore the logic level on both logic lines B>A and B>C is at a "0" level. That "0" level logic is inverted to a logic "1" level by the inverter 153 and therefore a logic "1" is presented to one input terminal of each of the AND gates 155 and 157. The logic "0" on the B>A logic line is applied directly to the AND gate 159 thereby necessitating a logic "0" level at its output Z1. The logic "0" on the B>C logic line is applied directly to one input terminal of the AND gate 157, thereby necessitating a logic "0" level on its output line Z3. The logic "0" on the B>C logic line is inverted to a logic "1" level through the inverter 161 and applied to the other input terminal of the AND gate 155. Since both inputs to the AND gate 155 are at a logic "1" level, the output Z2 is also at a logic "1" level. Therefore, in the present example, with the object at the position P2, the output signal Z2 from the logic circuit 109 is at a logic "1" level while the output signals Z1 and Z3 from the logic circuit 109 are at a logic "0" level. The indicators or annunciators 141, 143 and 145 are such that a logic "1" level will actuate them to provide a perceptive indication to an operator as to the zone in which the object is located. Therefore the indicator or annunciator 143 will, in the present example, provide such an indication. The control circuit 139 (FIG. 1) is arranged to detect which of the input signals thereto Z1, Z2 or Z3 is at a logic "1" level and, in accordance therewith, move the objective lens means 144 through the motor 142 to the associated stop Z1, Z2 or Z3 of the objective lens means 144. A limit switch 171 may be coupled to the motor 142 to insure the proper positioning of the objective lens means 144. Upon the receipt of a Z2 signal at a logic "1" level, the objective lens means 144 will move to its Z2 stop, at which point an image of the object will be properly focused on the light sensitive film 146 of a camera, for example.

Thus there has been provided, in accordance with the present invention, an improved range finder which may be used in combination with a camera, which range finder is simple in design and construction, having no moving parts, and provides a more accurate and reliable indication of the distance from the range finder to an object of interest.

The embodiments of the present invention in which an exclusive property or privilege is claimed are defined as follows:

1. A range finding device comprising:
   first and second stationary receiving means for receiving radiation from an object along first and second spatially separated light paths, respectively;
   stationary sensing means arranged to provide electrical signals representative of the relative position of the intensity distribution of said radiation passing through said first stationary receiving means with respect to the position of the intensity distribution of said radiation passing through said second stationary receiving means; and
   circuit means responsive to said electrical signals to provide an output signal representative of the distance between said object and the range finding device.

2. The range finding device as set forth in claim 1 wherein said stationary sensing means includes first and second sensing devices, said first sensing device including a first plurality $n$ of sensing elements, said second sensing device including a second plurality of sensing elements, said second plurality being greater than $n$, said circuit means including a comparison means for sequential but overlapping groups of $n$ elements in said second sensing device, said comparison means being operable to compare sensed signals from said first sensing device with sensed signals from each of said sequential groups of $n$ elements in said second sensing device and to provide said output signal determined by which group of $n$ elements in said second sensing device provides signals most similar to the signals from said first sensing device.

3. The range finding device as set forth in claim 2 and further including annunciator means arranged to receive said output signal and provide a perceptible indication thereof.

4. The range finding device as set forth in claim 1 and further including:
   objective lens means arranged to receive radiation from said objects;
   means defining an image plane said objective lens means being operable to form an image of said object at said image plane; and
   control means responsive to said output signal for moving said objective lens means to a position whereat said image is in focus at said image plane.

5. The range finding device as set forth in claim 4 wherein said control means includes means for moving said objective lens means to one of a predetermined number of distinct positions, each of said distinct positions corresponding to a zone of displacement from the range finder such that when said objective lens means is at one of said predetermined positions, all of the objects in a corresponding zone will be substantially focused at said image plane.

6. The range finding device as set forth in claim 5 wherein the number of sensing elements of said second sensing device is equal to the number of sensing elements in said first sensing device plus less lss than said predetermined number of zones of displacement.

7. The range finding device as set forth in claim 6 wherein said sensing elements are photo-voltaic elements.

8. A zonal range finding device comprising;

first and second stationary lens means for receiving radiation from an object along first and second spatially separated light paths, respectively;

first stationary sensing means positioned to be responsive to said radiation in said light path defined by said first lens means to produce an electrical signal representative of the light intensity distribution relative to said first sensing means;

second stationary sensing means positioned to be responsive to said radiation in said light path defined by said second lens means to produce electrical signals representative of the light intensity distribution relative to said second sensing means; said light intensity distribution relative to said second sensing means being a function of the zonal distance between said object and said range finding device.

and circuit means, including signal comparing means, responsive to said electrical signal from said first and second comparing means to provide an output signal representative of the zone of distance between said object and said range finding device.

9. A zonal range finding device as set forth in claim 8 wherein said first and second sensing means each include a plurality of linearly displaced light sensitive elements, the number of light sensitive elements in said second sensing means being greater than the number of such elements in said first sensing means whereby to define said distance zones.

* * * * *